US006963272B1

(12) United States Patent
Flick

(10) Patent No.: US 6,963,272 B1
(45) Date of Patent: *Nov. 8, 2005

(54) VEHICLE SECURITY SYSTEM SHOCK SENSING SIREN AND ASSOCIATED METHODS

(75) Inventor: Kenneth E. Flick, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 486 days.

This patent is subject to a terminal disclaimer.

(21) Appl. No.: 09/650,425

(22) Filed: Aug. 29, 2000

(51) Int. Cl.[7] .............................................. B60R 25/10
(52) U.S. Cl. ................ 340/426.24; 180/287; 307/10.2; 340/426.1
(58) Field of Search ................. 340/426, 429, 340/426.24, 426.1; 180/287; 307/10.2

(56) References Cited

U.S. PATENT DOCUMENTS

| 4,013,995 | A | * | 3/1977 | Adamo ........................ 340/429 |
| 4,383,242 | A | | 5/1983 | Sassover et al. ............ 340/539 |
| 4,996,515 | A | | 2/1991 | Schaffer et al. ............. 340/426 |
| 5,216,407 | A | * | 6/1993 | Hwang ........................ 340/426 |
| 5,543,776 | A | * | 8/1996 | L'Esperance et al. ....... 340/426 |
| 5,563,576 | A | | 10/1996 | Drori et al. .................. 340/455 |
| 5,612,670 | A | * | 3/1997 | Snyder et al. ............... 340/426 |
| 5,635,912 | A | | 6/1997 | McCracken .................. 340/692 |
| 5,703,411 | A | | 12/1997 | Bella et al. ................. 307/10.1 |
| 5,990,785 | A | * | 11/1999 | Suda ............................ 340/426 |
| 5,990,786 | A | * | 11/1999 | Issa et al. ..................... 340/429 |
| 6,140,914 | A | * | 10/2000 | Mueller et al. .............. 340/426 |

* cited by examiner

Primary Examiner—Brent A. Swarthout
(74) Attorney, Agent, or Firm—Allen, Dyer, Doppelt, Milbrath & Gilchrist, P.A.

(57) ABSTRACT

A vehicle security system may include at least one security sensor and a security controller connected thereto, and a siren which also serves as a shock sensor. The siren may include a housing, a siren security electrical signal generator circuit carried by the housing for generating an electrical siren security alarm signal responsive to the security controller, and a shock detector circuit carried by the housing for processing an electrical shock sense signal for the security controller. The siren also preferably includes an electrical/mechanical (E/M) transducer carried by the housing for sounding a siren security alarm responsive to the electrical siren security alarm signal, and for generating the electrical shock sense signal responsive to mechanical shock. In other words, the E/M transducer and associated circuitry provide the dual alternate functions of sounding the siren security alarm and sensing for shocks to the vehicle.

26 Claims, 5 Drawing Sheets

VEHICLE SECURITY SYSTEM SHOCK SENSING SIREN AND ASSOCIATED METHODS

FIELD OF THE INVENTION

The present invention relates to the field of security systems, and, more particularly, to a vehicle security system including a siren also sensing shocks and associated methods.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition. A typical security system also includes a receiver associated with the controller. The receiver cooperates with one or more remote transmitters typically carried by the user and which are used to arm and disarm the vehicle security system, for example. Other remote control features, such as locking or unlocking vehicle doors may also be performed.

The alarm indication provided at the vehicle is important to the overall effectiveness of the security system. For example, a weak alarm indication may do little to deter a would-be thief. A thief may also be more likely to target a vehicle when the vehicle is among hundreds of vehicles in a large parking lot, for example. In such a situation, the thief may be comforted in knowing that the alarm indication will not be identified by the vehicle's owner, since many audible alarm indications are generic.

Another disadvantage with many conventional security systems, especially minimal feature systems as typically installed by vehicle manufacturers, is that no shock sensing capability is provided. Accordingly, the alarm will only sound for opening of the vehicle doors, for example, and not when the vehicle is towed or lifted onto a truck and carried away. Since there is no shock sensor typically on such minimal feature security systems, there is no ability to provide a prewarn alarm that is less than the full alarm. The prewarn alarm in feature-rich aftermarket security systems may desirably warn off a would-be thief before serious damage is done to the vehicle. The prewarn, if falsely triggered, is also less intrusive than a full alarm.

SUMMARY OF THE INVENTION

In view of the foregoing background, it is therefore an object of the present invention to provide a vehicle security system including a siren, and related methods wherein shock sensing capability is more readily provided for the vehicle.

This and other objects, features and advantages in accordance with the present invention are provided by a vehicle security system including at least one security sensor and a security controller connected thereto, and a siren which also serves as a shock sensor. More particularly, the siren may comprise a housing, a siren electrical signal generator circuit carried by the housing for generating an electrical siren security alarm signal responsive to the security controller, and a shock detector circuit carried by the housing for processing an electrical shock sense signal for the security controller. In addition, the siren also preferably includes an electrical/mechanical (E/M) transducer carried by the housing for sounding a siren security alarm responsive to the electrical siren security alarm signal, and for generating the electrical shock sense signal responsive to mechanical shock. In other words, the E/M transducer and associated circuitry provide the dual alternate functions of sounding the siren security alarm and sensing for shocks to the vehicle. The siren provides a compact, portable, and readily installed device which can be used alone or to upgrade an existing vehicle security system, for example.

The vehicle also typically includes an ignition switchable between ON and OFF positions. To avoid undesired alarm soundings or shock sensing, the siren may be operable responsive to the ignition being in the OFF position and not operable responsive to the ignition being in the ON position.

The security controller is also typically switchable between an armed mode for causing the siren to generate the siren security alarm responsive to the at least one security sensor, and a disarmed mode. In addition, the vehicle security sensor may comprise a hood switch, and the shock detector may be operatively coupled to the security controller through the hood switch to simplify installation and connection of the siren. In other words, the siren shock sense output can be coupled to the hood switch, and the siren alarm will not sound unless the security controller is in the armed mode. This is so since the hood switch will not trigger an alarm unless the controller is in the armed mode.

Another aspect of the invention relates to the ability to provide a prewarn and full alarms. More particularly, the shock detecting circuit may generate a first output based upon detecting a shock within a first intensity range, and may generate a second output based upon detecting a shock within a second intensity range. The first intensity range may be less than the second intensity range, and the first output may then cause a reduced siren security alarm, or prewarn alarm, and the second output may cause the full siren security alarm.

In some embodiments, the commonly used E/M transducer may comprise a loudspeaker. In addition, the housing of the siren may be for mounting within a vehicle engine compartment.

Another aspect of the invention relates to a method for providing vehicle security. The method may comprise connecting a siren in the vehicle, the siren comprising a housing, a siren electrical signal generator circuit carried by the housing, a shock detector circuit carried by the housing, and an electrical/mechanical (E/M) transducer carried by the housing. The method may also include generating an electrical siren security alarm signal using the siren electrical signal generator circuit and sounding a siren security alarm responsive thereto using the E/M transducer. And the method may also include generating the electrical shock sense signal responsive to mechanical shock using the E/M transducer and processing the electrical shock sense signal using the shock detector circuit.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
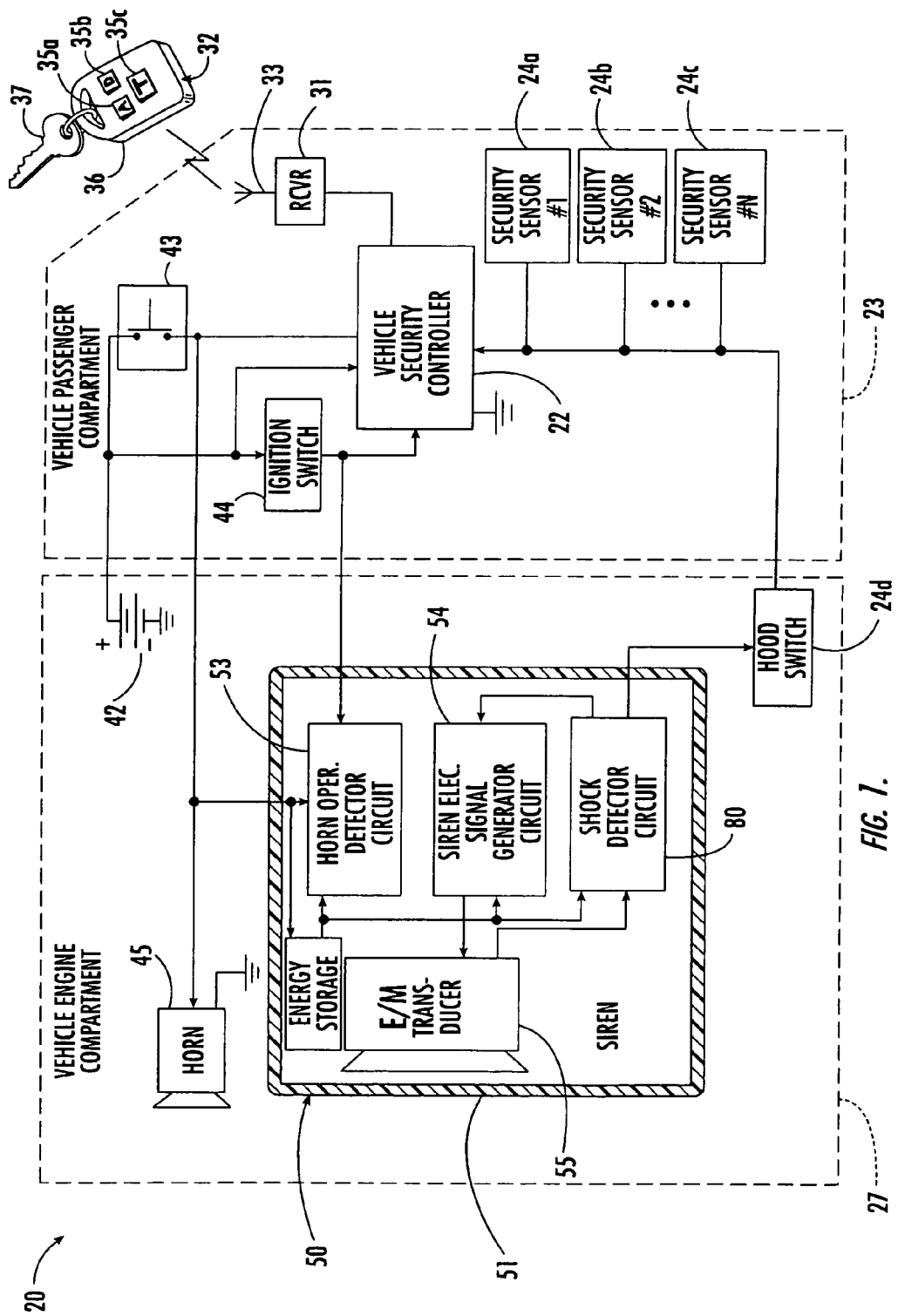
FIG. 1 is a schematic block diagram of a vehicle security system including the siren in accordance with the present invention.

The vehicle security system 20, including the siren 50, in accordance with the invention is first described with reference to FIGS. 1 and 2. The security system 20 includes a vehicle security controller 22 which is illustratively positioned in the vehicle passenger compartment 23 as is typical. The security controller 22 is connected to one or more vehicle security sensors, such as sensors 1-N, 24a–24c, respectively. As will be appreciated by those skilled in the art, these sensors 24a–24c may be various switches or other sensors carried by the vehicle to detect attempted theft or tampering with the vehicle.

A hood switch or position sensor 24d is also connected to the security controller 22 in the illustrated embodiment. The hood switch 24d is typically positioned in the vehicle engine compartment 27 and detects opening of the vehicle hood as will also be readily appreciated by those skilled in the art. This hood switch 24d may be advantageously used to interface with the security controller 22 as will be explained in greater detail below.

A receiver 31 and its associated antenna 33 may receive signals from a handheld remote transmitter 32. For example, the remote transmitter 32 may include one or more buttons or switches 35a–35c carried by a housing 36. These switches 35a–35c may be used to arm or disarm the vehicle security controller 22, or may be used to remotely open the vehicle trunk. The switches 35a–35c may alternately or additionally be used to lock and unlock the vehicle doors remotely as will be readily appreciated by those skilled in the art. The housing 36 may also carry a one or more keys, such as the ignition key 37, as shown in the illustrated embodiment.

In some embodiments, the receiver 31 may be a changing code receiver and the remote transmitter may be a changing code transmitter 32 for additional security. By changing code is meant that the remote transmitter 32 transmits at least a code portion which is pseudorandomly coded, and which is synchronized with the receiver 31. Accordingly, merely recording a transmission from the remote transmitter 32 and playing back the transmission with a so-called "code grabber" will not operate the changing code receiver 31 as will be appreciated by those skilled in the art.

The security controller 22 is also illustratively connected to an ignition switch 44. In addition, the security controller 22 in the illustrated embodiment provides an alarm output via the vehicle horn 45. More particularly the horn 45 is electrically operable by the user based upon the user selectively depressing a horn switch 43 which, in turn, selectively connects the horn to the vehicle power supply, such as the schematically illustrated vehicle battery 42. In other words, the horn switch 43 permits selective occasional operation of the horn 45 by the user, such as to signal other motorists or pedestrians when the user is operating the vehicle.

The vehicle security controller 22 is also connected to drive or operate the horn 45. For example, and as will be readily appreciated by those skilled in the art, the security controller 22 may be connected to the horn 45 by splicing or connecting to the appropriate wires as are accessible adjacent the steering column within the passenger compartment 23. These wires pass through the firewall of the vehicle into the engine compartment 27 as will be appreciated by those skilled in the art.

The vehicle security controller 22 may operate the horn 45 in a predetermined pattern to sound the horn security alarm responsive to one or more of the security sensors 24a–24d, such as to indicate a vehicle security breach. For example, the vehicle security controller 22 may operate the horn 45 in a pattern including a series of operations of the horn within a predetermined time, and/or with each operation having a predetermined duration. Alternately, the security controller 22 may sound the horn 45 continuously for longer than a predetermined time.

The security system 20 advantageously includes a siren 50 for sounding a siren security alarm to supplement a horn security alarm responsive to operation of the horn in the predetermined pattern, such as provided by the security controller 22. In addition, the siren 50 preferably does not sound the siren security alarm responsive to selective occasional operation of the horn 45, such as caused by the user pressing the horn switch 43.

For example, the horn operation detector circuit 53 may include a pattern detection circuit 61 (FIG. 2) which analyzes the driving signals to the horn 45 and determines whether, for example, X number of horn pulses are being provided within a given time T1, and/or whether a series of X horn pulses are being provided with each pulse having a length or duration of a predetermined time T2. The horn operation detector circuit 53 may also include a continuous pattern of operation detector circuit 62 which determines or detects whether the horn 45 is being operation for longer than a predetermined time T3. Of course, the outputs of these two pattern detector circuits 61, 62 can be combined with the illustrated OR gate 63, and, in turn, the output of the OR gate can be fed into an AND gate 64 which also receives the ignition OFF signal as an input.

The ignition OFF signal is illustratively provided via an inverting logic gate 65 connected to a switched positive voltage output of the ignition switch 44, so that when the ignition is OFF, a logic ONE is input to the input of the AND gate 64. Other logic circuitry and arrangements are contemplated by the present invention as will be appreciated by those skilled in the art.

The siren 50 by itself can be retrofitted to an existing vehicle security system 20 with only a few simple electrical connections readily made within the engine compartment 27. The complete security system 20 can also be readily and easily installed as a complete package as will also be appreciated by those skilled in the art.

In some embodiments, the siren 50 may be further enhanced to avoid false or undesired triggering of the siren alarm, as when the horn 45 is manually operated by the user, by further basing sounding of the siren security alarm on the vehicle ignition switch 44 as mentioned briefly above. The vehicle typically includes the ignition switch 44 being switchable between ON and OFF positions. In accordance with this aspect of the invention, the siren 50 may sound the siren security alarm further responsive to detecting the ignition 44 being in the OFF position. In addition, the siren 50 may not sound the siren security alarm further responsive to detecting the ignition 44 being in the ON position. The horn 45 is typically manually operated by the user when driving with the ignition switch 44 in the ON position, avoiding sounding the siren security alarm with the ignition ON may also be desirable. This ignition sensing feature of the siren 50 may be used in combination with the horn operation pattern detecting, or may be used by itself.

To further aid the effective interfacing with the horn 45 and security controller 22, the siren 50 may have a start delay time so that sounding the siren security alarm is delayed after operation of the horn 45 is started. This may also reduce false or undesired triggering for manual operation of the horn 45. The siren 50 may also have a stop delay time so that sounding the siren security alarm continues only for a short time until after operation of the horn 45 is stopped. The start and/or stop delay may be implemented by the schematically illustrated start/stop delay(s) circuit 56 (FIG. 2) which may be a portion of the horn operation detector circuit 53. For example, the start delay may be 10 to 15 seconds, and, the stop delay may be about 1 second. Other delays are also possible.

As shown in the illustrated embodiment, the siren 50 may comprise a housing 51, an audio alarm generator carried by the housing for sounding the siren security alarm, and a horn operation detector or detector circuit 53 carried by the housing for detecting operation of the horn 45, such as in the predetermined pattern and for operating the audio alarm generator responsive thereto. The horn operation detector circuit 53 may also detect the position of the ignition switch 44 as described above. The audio alarm generator may include the illustrated siren electrical signal generating circuit 54, and the E/M transducer 55, such as a loudspeaker, connected to the siren electrical signal generating circuit. In other terms, the audio alarm generator includes the circuitry 54 for generating the electrical siren drive signal, and the E/M transducer 55 for converting the electrical energy or signal into the mechanical or acoustical energy or audible signal.

The siren 50 may also include at least one energy storage device 58 (FIG. 2), such as a battery or capacitor to power the siren if power from the vehicle is not available. Typically, however, the energy storage device 58 may not be needed as the siren 50 can be powered from the vehicle battery 42 or electrical system, for example.

In one particularly, advantageous embodiment, the siren electrical signal generator circuit 54 may produce a multiple-tone siren pattern as disclosed in U.S. patent application Ser. No. 09/374,178, filed Aug. 13, 1999, and Ser. No. 09/596,547, filed Jun. 19, 2000. The subject matter of each patent application is incorporated herein by reference in its entirety.

The E/M transducer 55 may be provided by a conventional loudspeaker, for example. The E/M transducer 55 may include a metal frame 71 (FIG. 2) having a frusto-conical shape, and which mounts a high-powered permanent magnet 72 at its smaller end. A movable diaphragm 73 is also carried by the frame 71. The diaphragm 73 is connected to a voice coil 74 adjacent the permanent magnet 72. The voice coil 74, in cooperation with the permanent magnet 72, moves the diaphragm 73 responsive to the electrical drive signal from the siren electrical signal generator circuit 54. Movement of the diaphragm 73 generates the acoustic waves or sounds for the siren security alarm indication. In other embodiments, the E/M transducer 55 may be based on piezoelectric or types of driving different than electromagnetic driving as will be appreciated by those skilled in the art.

In accordance with another advantageous feature of the invention, the siren 50 may include the illustrated shock detector circuit 80 connected to the E/M transducer 55 for determining a shock to the vehicle. The shock detector circuit 80 is also preferably carried by the housing 51. The shock detector circuit 80 is for processing an electrical shock sense signal from the E/M transducer 55, and for generating a siren alarm indication and/or communicating the shock determination to the vehicle security controller 22. The present invention takes advantage of the ability of the E/M transducer 55 to also convert mechanical or acoustic energy into electrical energy. As the diaphragm 73 is moved relative to the frame 71 by a shock to the vehicle, an electrical signal is generated as the voice coil 74 moves in the presence of the magnetic field generated by the permanent magnet 72 as will be appreciated by those skilled in the art. U.S. Pat. No. 4,383,242 to Sassover et al. discloses, for example, using the stereo speakers of a vehicle entertainment system to detect unauthorized access attempts into the vehicle. The entire disclosure of this patent is incorporated herein by reference.

In accordance with this aspect of the invention, the E/M transducer 55 and the associated circuitry provide the dual alternate functions of sounding the siren security alarm and sensing for shocks to the vehicle. The siren 50 thus provides a compact, portable, and readily installed device which can be used alone or to upgrade an existing vehicle security system, for example.

As described herein, the vehicle also typically includes an ignition switch 44 switchable between ON and OFF positions. To avoid undesired alarm soundings or shock sensing, such as when the user is entering or using the vehicle, the siren 50 may be operable as a shock sensor responsive to the ignition being in the OFF position and not operable responsive to the ignition being in the ON position.

Yet another feature of the invention also relates to avoiding false or undesired alarms. The vehicle security controller 22, as described above, is also typically switchable between an armed mode and a disarmed mode, such as controlled by the remote transmitter 32. In the armed mode, the security controller 22 causes the siren 50 and/or horn 45 to generate a security alarm responsive to the security sensors 24a–24d. In the disarmed mode, the security controller 22 does not generate such an alarm despite signals from the sensors 24a–24d so that the user can use the vehicle. Accordingly, an output of the shock detector circuit 80 can be operatively coupled in parallel with a nearby security sensor within the engine compartment 27, such as the hood switch 24d. Depending on the configuration of hood switch 24d circuit connection, the output of the shock detector circuit may be connected in electrical parallel or series with the hood switch as will be appreciated by those skilled in the art.

When connected to the hood switch 24d, and if the security controller 22 is armed, the output of the shock detector circuit 80 will cause the vehicle security controller to be triggered, thereby causing generation of the horn and/or siren security alarms. Conversely, if the security controller 22 is in the disarmed mode, the output of the shock detector circuit 80 will not cause the security controller to generate an alarm. Connection to the nearby sensor, such as the hood switch 24d, greatly simplifies installation. Of course, other similar false or undesired alarm bypass techniques are also contemplated by the present invention, and, indeed other sensors could be connected to, in addition to, or in place of the hood switch 24d.

Another aspect of the invention relates to the ability of the siren 50 to provide a prewarn and full alarms in some embodiments. More particularly, the shock detecting circuit 80 may generate a first output based upon detecting a shock within a first intensity range, and may generate a second output based upon detecting a shock within a second intensity range. The first intensity range may be less than the second intensity range, and the first output may then cause a reduced siren security alarm, or prewarn alarm, and the second output may cause the full siren security alarm.

Figure 2:
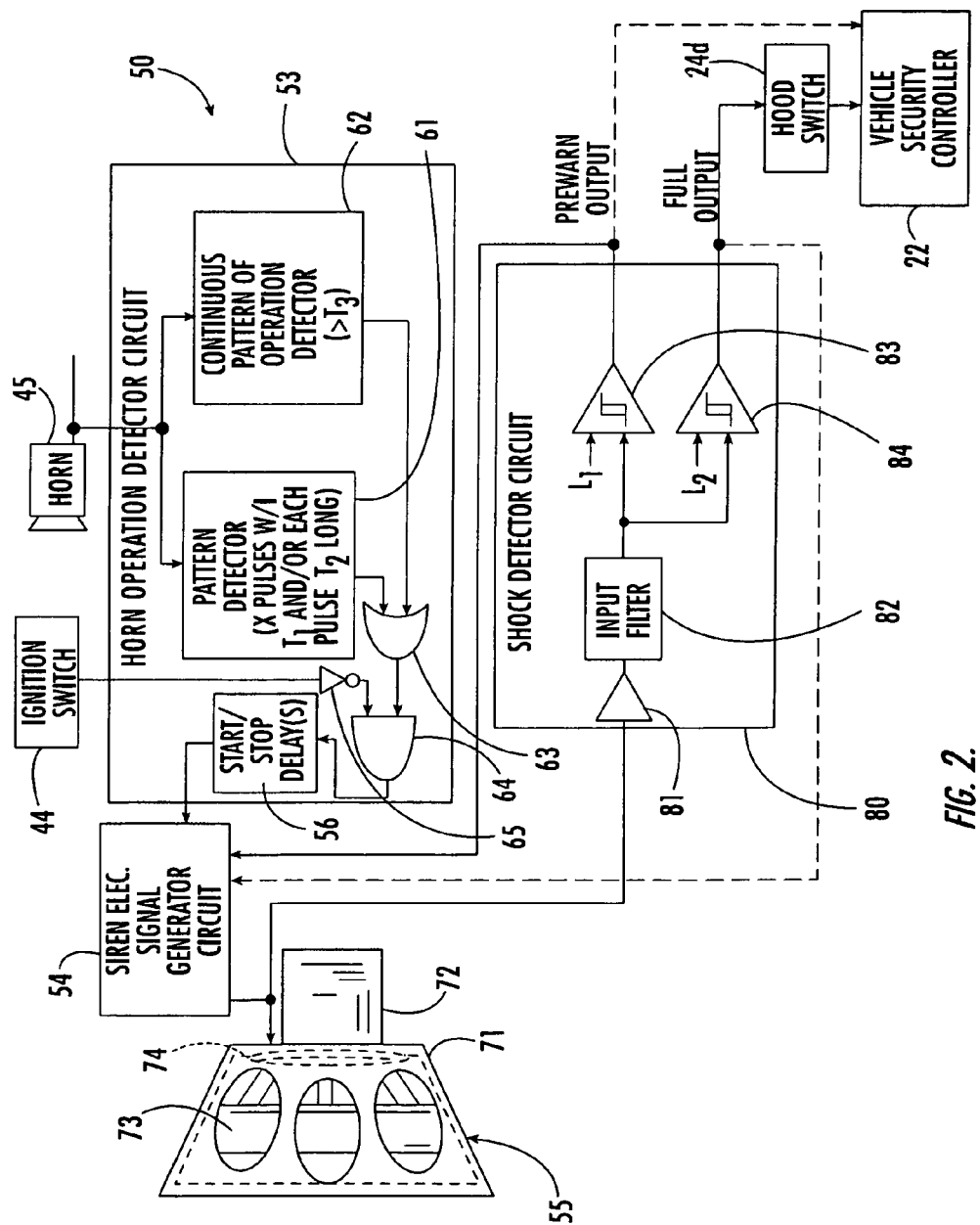
FIG. 2 is a more detailed schematic block diagram of the siren shown in FIG. 1.

Referring more particularly to the more detailed schematic block diagram in FIG. 2 for the shock detector circuit 80, one approach to implement this dual shock detecting approach is now described in greater detail. The signal from the E/M transducer 55 is coupled through an amplifier 81 and filter 82 to a pair of comparators 83, 84. The prewarn alarm comparator 83 compares the input signal against a first threshold L1, and generates a prewarn output if the input signal is greater than L1. Similarly, the full alarm comparator 84 compares the input signal to a second higher threshold L2. If the input signal is above L2, then a full alarm output is generated by the full alarm comparator 84. Those of skill in the art will appreciate other equivalent signal detection circuits than can provide both a prewarn and full alarm output. In addition, more than two levels could also be provided. One or both of the comparators 83, 84 may also be provided with hysteresis, as will also be appreciated by those skilled in the art.

In the illustrated embodiment, the prewarn output from the prewarn alarm comparator 83 is connected to the siren electrical signal generator circuit 54. Accordingly, the siren 50 may generate a short chirp prewarn signal from the E/M transducer 55 after a prewarn level shock has been detected.

As also shown in the illustrated embodiment, the full alarm comparator 84 may have its output coupled to the hood switch 24d as described above to couple to the vehicle security controller 22. In yet other embodiments, both outputs could be coupled to the siren electrical signal generator 54 or both outputs could be connected to the vehicle security controller 22 as will also be appreciated by those skilled in the art.

Figure 3:
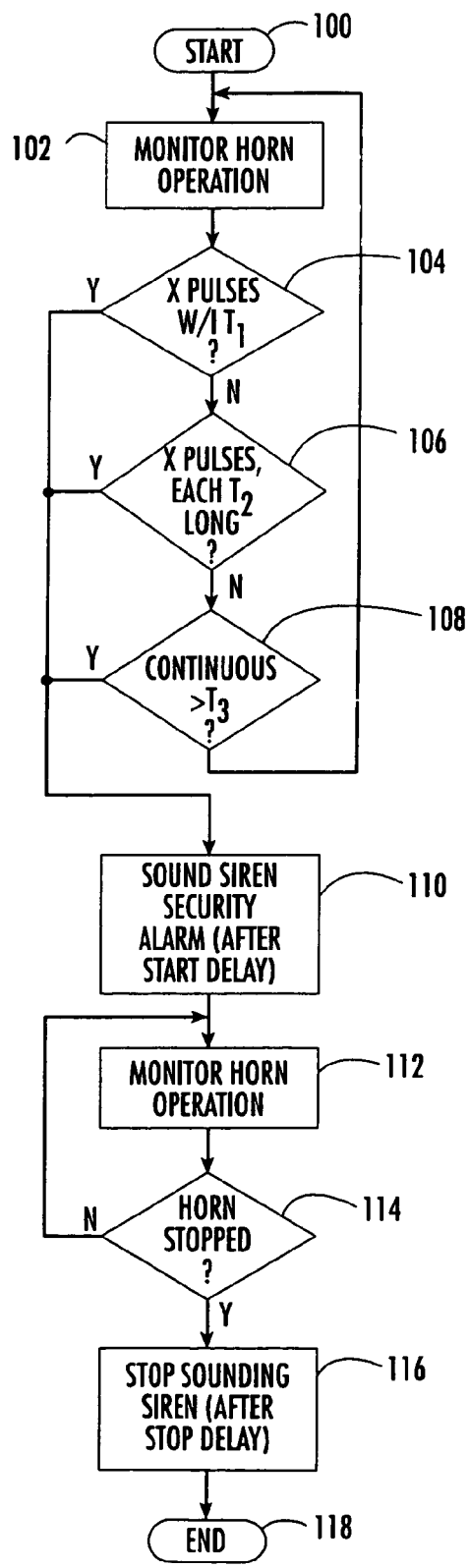
FIG. 3 is a flowchart illustrating a first method embodiment in accordance with the invention.

Turning now additionally to the flowchart of FIG. 3 a method aspect of the invention is now described as relates to a method for supplementing a horn security alarm in a vehicle. The vehicle is of a type including a horn 45 being electrically operable, a horn switch 43 permitting selective occasional operation of the horn by a user, at least one security sensor 24a–24d, and a security controller 22 for operation of the horn to sound the horn security alarm responsive to the at least one security sensor. From the start (Block 100), the method may comprise monitoring the horn 45 for operation at Block 102, and sounding the siren security alarm (Block 110) to supplement the horn security alarm responsive to detecting operation of the horn 45 in a predetermined pattern. The operation of the horn may be analyzed to determine whether an X number of pulses have been detected within time T1 at Block 104. If so, the siren security alarm is sounded (Block 110). If not, the horn operation is analyzed to determine if each of X pulses has a time duration of T2 at Block 106. If so, the siren security alarm is sounded. If not, then at Block 108 it is determined whether the horn is being continuously operated for longer than a time T3, and, if so, the siren security alarm is sounded. Accordingly, the siren security alarm is sounded when the horn 45 is operated in a predetermined pattern, such as would occur under control of the vehicle security controller 22, and the siren security alarm is prevented from sounding responsive to selective occasional operation of the horn, such as by the user.

In one embodiment, analyzing or considering the horn pulses to determine the predetermined pattern may comprise considering the number of leading and trailing edges of the power pulse used to sound the horn 45. A single pressing of the horn switch 43 by the user will cause two edges within a predetermined time, such as about 10 to 12 seconds. Accordingly, the method may prevent sounding the siren security alarm based upon detecting two transitions within this time. A vehicle security controller 22 may also provide a series of horn power pulses producing greater than nine transitions within a set time, and this number is higher than a user would generate honking the horn several times within the predetermined time. In other terms, the number of transitions of the horn pulses can be counted, and if equal to one, or greater than nine, for example, the siren security alarm is sounded, and otherwise the operation of the horn 45 is ignored.

As discussed above, sounding the siren security alarm at Block 110 can be delayed based upon a start-up delay time. In addition, while the siren security alarm is being sounded, it may be desirable to continue to monitor the horn operation (Block 112) to determine whether the horn has stopped at Block 114. If not, the siren security alarm continues and the horn is also monitored until stoppage of the horn is detected at Block 114. The siren security alarm may be stopped at Block 116 before ending at Block 118. Of course, a stop delay may also be provided before stopping sounding of the siren security alarm (Block 116).

Figure 4:
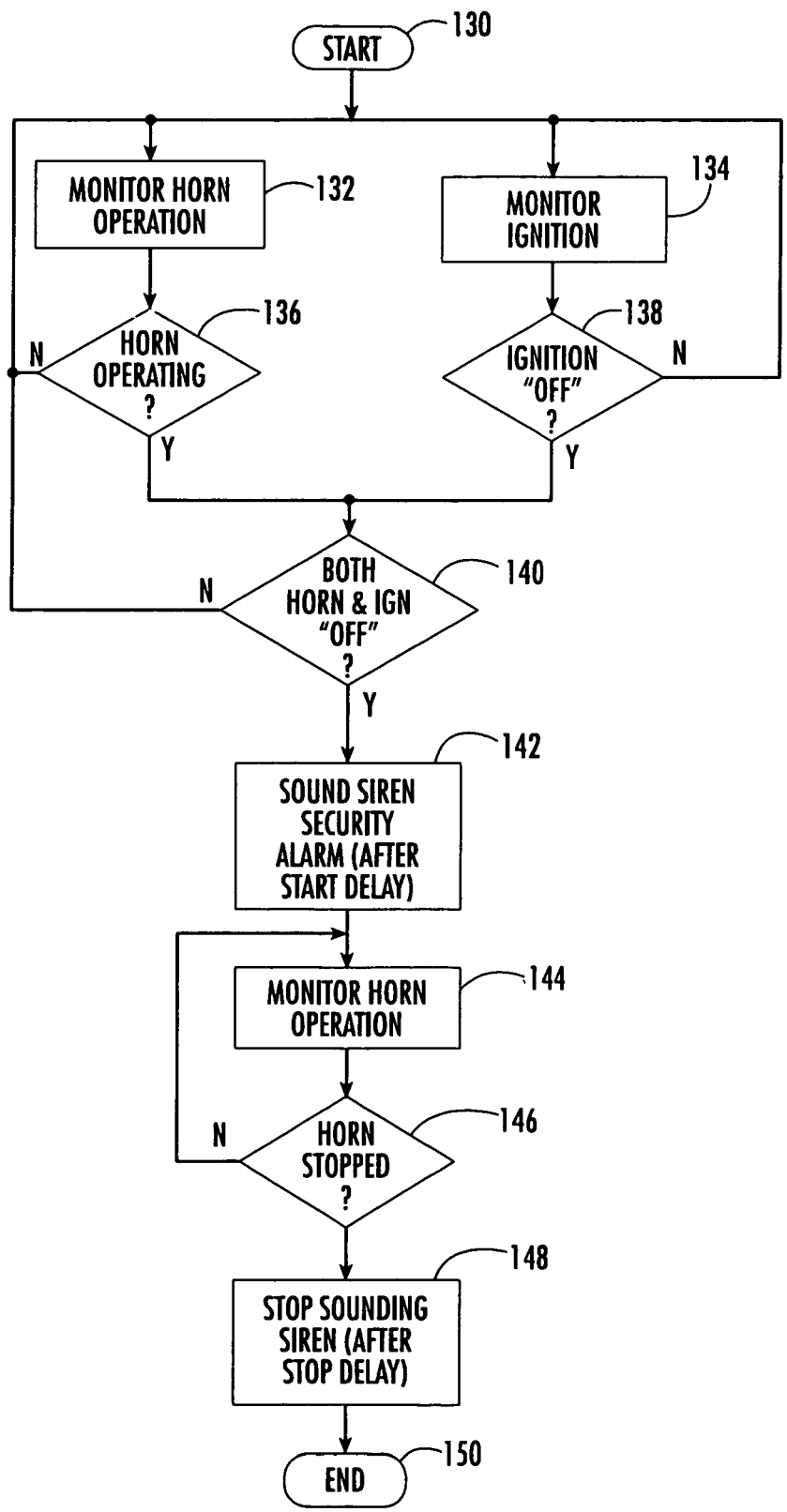
FIG. 4 is a flowchart illustrating a second method embodiment in accordance with the invention.

Another aspect of the invention relates to monitoring the ignition 44 in addition to the horn 45, as explained with reference to the flowchart of FIG. 4. From the start (Block 130) both the horn 45 and the ignition switch 44 are monitored at Block 132 and Block 134, respectively. If both the horn is being operated (Block 136) and the ignition is OFF (Block 138) as determined at Block 140, the siren security alarm may be sounded at Block 142. Of course, the siren may be sounded after a start delay if desired.

The siren will continue to sound until monitoring the horn (Block 144) indicates that the horn has stopped (Block 146). The siren security alarm may then be stopped at Block 148 before ending (Block 150). The stop delay may also be provided. In this illustrated embodiment, the sounding of the siren security alarm is based upon both the ignition switch 44 being OFF and the horn 45 being operated. The concept of determining that the horn 45 is being operated in a predetermined pattern can also be combined with the ignition monitoring in accordance with the invention as will be understood by those skilled in the art.

Figure 5:
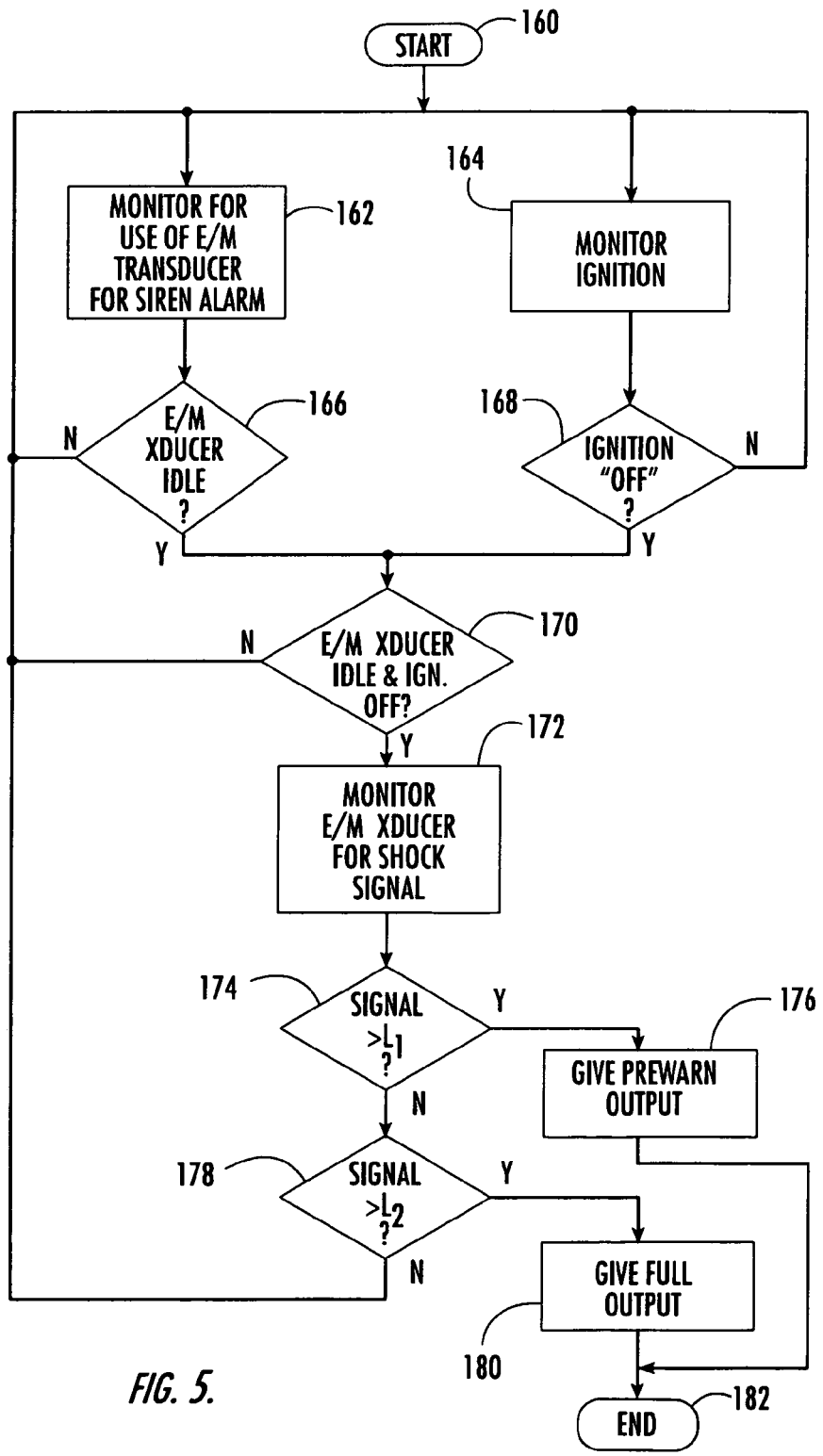
FIG. 5 is a flowchart illustrating a third method embodiment in accordance with the present invention.

Turning now additionally to the flowchart of FIG. 5, the shock sensing feature of the present invention will be further described. From the start (Block 160), the E/M transducer 55 may be monitored for operation by the siren electrical signal generator circuit 54 (Block 132), and while the ignition switch 44 is also monitored (Block 164). If the E/M transducer 55 is sounding, the shock sensing feature is, of course, bypassed (Block 166). Also, in the illustrated embodiment, if the ignition switch is ON (Block 168), the shock sensing feature is also bypassed. If, however, the E/M transducer 55 is idle, and the ignition switch 44 is OFF as determined at Block 170, then the E/M transducer is monitored at Block 172 for shock signals.

If the shock signal is greater than a first threshold or value L1 (Block 174), a prewarn output may be given at Block 176. If the shock signal is also greater than a second threshold or value L2 (Block 178), the a full siren security alarm output may be given at Block 180, before stopping at Block 182. Both outputs could be given for the higher threshold shock or the prewarn output could be suppressed. In addition, the prewarn and full alarm output signals could be multiplexed for communication over a single pair of wires to the vehicle security controller 22 as will be readily appreciated by those skilled in the art. Other details and aspects of this method of the invention are described in greater detail above, and require no further description at this time.

Considered in somewhat different terms, this method aspect may include connecting a siren 50 in the vehicle, the siren comprising a housing 51, a siren security alarm generator circuit 54 carried by the housing, a shock detector circuit 80 carried by the housing, and an E/M transducer 55 carried by the housing. The method may also include generating an electrical siren security alarm signal using the siren security alarm generator 54 and sounding a siren security alarm responsive thereto using the E/M transducer 55. The method may also include generating the electrical shock sense signal responsive to mechanical shock using the E/M transducer 55 and processing the electrical shock sense signal using the shock detector circuit 80.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

That which is claimed is:

1. A vehicle security system comprising:
   at least one security sensor and a security controller connected thereto;
   a siren comprising
      a common housing to be positioned within an engine compartment of a vehicle,
      a siren electrical signal generator circuit carried by said common housing for generating an electrical siren security alarm signal responsive to said security controller,
      a shock detector circuit carried by said common housing for processing an electrical shock sense signal for said security controller, and
      a common electrical/mechanical (E/M) transducer carried by said common housing for both sounding a siren security alarm responsive to the electrical siren security alarm signal, and for generating the electrical shock sense signal responsive to mechanical shock.

2. A vehicle security system according to claim 1 wherein the vehicle includes an ignition switchable between ON and OFF positions; and wherein said siren is operable responsive to the ignition being in the OFF position and is not operable responsive to the ignition being in the ON position.

3. A vehicle security system according to claim 1 wherein said security controller is switchable between an armed mode for causing said siren to generate the siren security alarm responsive to said at least one security sensor, and a disarmed mode.

4. A vehicle security system according to claim 3 wherein said at least one vehicle security sensor comprises a hood switch; and wherein said shock detector is operatively coupled to said security controller through said hood switch.

5. A vehicle security device according to claim 1 wherein said shock detecting circuit generates a first output based upon detecting a shock within a first intensity range, and generates a second output based upon detecting a shock within a second intensity range.

6. A vehicle security device according to claim 5 wherein the first intensity range is less than the second intensity range; and wherein the first output causes a reduced siren security alarm and the second output causes a full siren security alarm.

7. A vehicle security device according to claim 1 wherein said common E/M transducer comprises a loudspeaker.

8. A vehicle security system according to claim 1 further comprising a receiver connected to said security controller, and at least one remote transmitter communicating with said receiver.

9. A vehicle security system according to claim 8 wherein said receiver and said at least one remote transmitter operate with changing codes.

10. A siren for operation with a vehicle security system comprising at least one security sensor and a security controller connected thereto, the siren comprising:
    a common housing to be positioned within an engine compartment of a vehicle;
    a siren electrical signal generator circuit carried by said common housing for generating an electrical siren security alarm signal responsive to the security controller;
    a shock detector circuit carried by said common housing for processing an electrical shock sense signal for the security controller; and
    a common electrical/mechanical (E/M) transducer carried by said common housing for both sounding a siren security alarm responsive to the electrical siren security alarm signal, and for generating the electrical shock sense signal responsive to mechanical shock.

11. A siren according to claim 10 wherein the vehicle includes an ignition switchable between ON and OFF positions; and wherein said siren is operable responsive to the ignition being in the OFF position and is not operable responsive to the ignition being in the ON position.

12. A siren according to claim 10 wherein the security controller is switchable between an armed mode for causing said siren to generate the siren security alarm responsive to said at least one security sensor, and a disarmed mode.

13. A siren according to claim 12 wherein the at least one vehicle security sensor comprises a hood switch; and wherein said shock detector is operatively coupled to the security controller through the hood switch.

14. A siren according to claim 10 wherein said shock detecting circuit generates a first output based upon detecting a shock within a first intensity range, and generates a second output based upon detecting a shock within a second intensity range.

15. A siren according to claim 14 wherein the first intensity range is less than the second intensity range; and wherein the first output causes a reduced siren security alarm and the second output causes a full siren security alarm.

16. A siren according to claim 10 wherein said common E/M transducer comprises a loudspeaker.

17. A siren comprising:
a common housing to be positioned within an engine compartment of a vehicle;
a siren electrical signal generator circuit carried by said common housing for generating an electrical siren security alarm signal;
a shock detector circuit carried by said common housing for processing an electrical shock sense signal; and
a common electrical/mechanical (E/M) transducer carried by said common housing for both sounding a siren security alarm responsive to the electrical siren security alarm signal, and for generating the electrical shock sense signal responsive to mechanical shock.

18. A siren according to claim 17 wherein a vehicle includes an ignition switchable between ON and OFF positions; and wherein said siren is operable responsive to the ignition being in the OFF position and is not operable responsive to the ignition being in the ON position.

19. A siren according to claim 17 wherein said shock detecting circuit generates a first output based upon detecting a shock within a first intensity range, and generates a second output based upon detecting a shock within a second intensity range.

20. A siren according to claim 19 wherein the first intensity range is less than the second intensity range; and wherein the first output causes a reduced siren security alarm and the second output causes a full siren security alarm.

21. A siren according to claim 17 wherein said common E/M transducer comprises a loudspeaker.

22. A method for providing vehicle security comprising:
connecting a siren within an engine compartment of the vehicle, the siren comprising a common housing within the engine compartment of the vehicle, a siren electrical signal generator circuit carried by the common housing, a shock detector circuit carried by the common housing, and a common electrical/mechanical (E/M) transducer carried by the common housing;
generating an electrical siren security alarm signal using the siren electrical signal generator circuit and sounding a siren security alarm responsive thereto using the common E/M transducer; and
generating the electrical shock sense signal responsive to mechanical shock using the common E/M transducer and processing the electrical shock sense signal using the shock detector circuit.

23. A method according to claim 22 wherein the vehicle includes an ignition switchable between ON and OFF positions; and further comprising operating the siren responsive to the ignition being in the OFF position and not operating the siren responsive to the ignition being in the ON position.

24. A method according to claim 22 further comprising using the shock detecting circuit to generate a first output based detecting a shock within a first intensity range, and to generate a second output based upon detecting a shock within a second intensity range.

25. A method according to claim 24 wherein the first intensity range is less than the second intensity range; and further comprising generating a reduced siren security alarm responsive to the first output, and generating a full siren security alarm responsive to the second output.

26. A method according to claim 22 wherein the common E/M transducer comprises a loudspeaker.

* * * * *